United States Patent
Blanco

(10) Patent No.: US 11,643,058 B2
(45) Date of Patent: May 9, 2023

(54) METHOD AND DEVICE FOR CONTROLLING EMERGENCY BRAKING DISTANCE

(71) Applicant: RENAULT s.a.s., Boulogne Billancourt (FR)

(72) Inventor: Yann Blanco, Paris (FR)

(73) Assignee: RENAULT s.a.s., Boulogne Billancourt (FR)

(*) Notice: Subject to any disclaimer, the term of this patent is extended or adjusted under 35 U.S.C. 154(b) by 0 days.

(21) Appl. No.: 16/644,763

(22) PCT Filed: Jul. 9, 2018

(86) PCT No.: PCT/FR2018/051716
§ 371 (c)(1),
(2) Date: Mar. 5, 2020

(87) PCT Pub. No.: WO2019/048746
PCT Pub. Date: Mar. 14, 2019

(65) Prior Publication Data
US 2021/0061242 A1   Mar. 4, 2021

(30) Foreign Application Priority Data

Sep. 6, 2017 (FR) ..................... 17 58199

(51) Int. Cl.
*B60T 7/22* (2006.01)
*B60T 8/1755* (2006.01)
*B60T 8/172* (2006.01)

(52) U.S. Cl.
CPC ............ *B60T 7/22* (2013.01); *B60T 8/17558* (2013.01); *B60T 8/172* (2013.01); *B60T 2201/022* (2013.01); *B60T 2210/32* (2013.01)

(58) Field of Classification Search
CPC ........ B60T 7/22; B60T 8/17558; B60T 8/172; B60T 2201/022; B60T 2210/32
See application file for complete search history.

(56) References Cited

U.S. PATENT DOCUMENTS

2014/0343813 A1* 11/2014 Morselli ............... B60T 13/686
                                                            180/14.1
2015/0012204 A1   1/2015 Breuer et al.
(Continued)

FOREIGN PATENT DOCUMENTS

| CA | 2 860 892 A1 | 5/2013 | |
| FR | 2929909 A1 * | 10/2009 | ............ B60T 13/662 |
| WO | WO 2015/113679 A1 | 8/2015 | |

OTHER PUBLICATIONS

International Search Report dated Sep. 12, 2018 in PCT/FR2018/051716 filed Jul. 9, 2018, 2 pages.
(Continued)

*Primary Examiner* — Aniss Chad
*Assistant Examiner* — Madison R Hughes
(74) *Attorney, Agent, or Firm* — Oblon, McClelland, Maier & Neustadt, L.L.P.

(57) ABSTRACT

A driver assistance system includes a braking module and a module for controlling emergency braking distance. The braking module is intended to be connected to brakes. The module for controlling braking distance is connected to an output of the braking module.

10 Claims, 4 Drawing Sheets

(56) References Cited

U.S. PATENT DOCUMENTS

2015/0283985 A1* 10/2015 Korthals .................. B60T 8/74
                                                          701/70
2016/0221549 A1    8/2016 Tanase et al.
2017/0015288 A1*  1/2017 Coelingh ................ B60T 8/171
2017/0166172 A1    6/2017 Kwon et al.
2017/0174194 A1    6/2017 Baumgaertner et al.
2017/0369062 A1* 12/2017 Saigusa ................. B60W 50/04
2019/0256064 A1*  8/2019 Hecker ............... B60W 30/095
2020/0010059 A1*  1/2020 Busse ................. B60T 8/17555

OTHER PUBLICATIONS

Preliminary French Search Report and Written Opinion dated Apr. 18, 2018 in French Patent Application No. 1758199 filed Sep. 6, 2017, (with English translation of Category of Cited Documents), 7 pages.

* cited by examiner

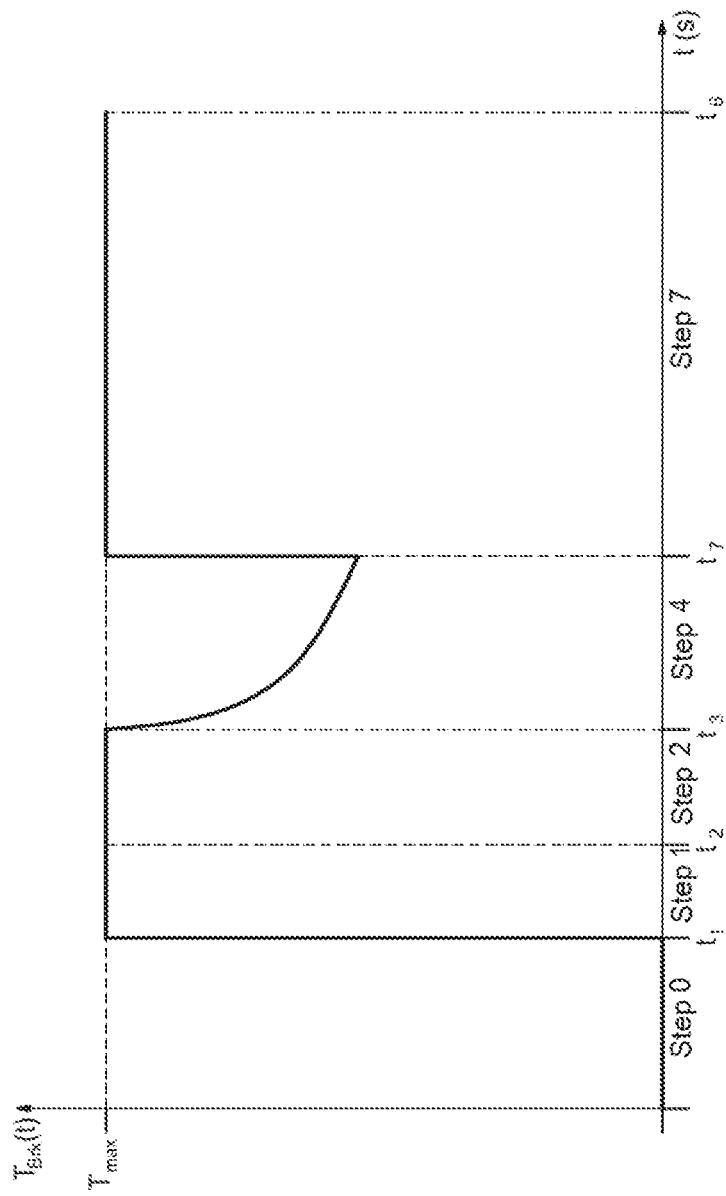

METHOD AND DEVICE FOR CONTROLLING EMERGENCY BRAKING DISTANCE

The present invention relates to a driver assistance method and system, known to the person skilled in the art by the acronym ADAS ("Advanced Driver Assistance System"). It relates more particularly to an emergency braking method and module for a motor vehicle known to the person skilled in the art by the acronym AEBS ("Autonomous Emergency Braking System").

An emergency braking module AEB makes it possible to trigger an automatic braking of a motor vehicle equipped with such a system.

FIG. 1 illustrates the architecture of an emergency braking module 3 incorporated in a driver assistance system 2 of a vehicle 1 according to the state of the art which interacts with a target 6.

The vehicle 1 comprises perception means 4, notably distance sensors, linked to an input E2 of the driver assistance system 2. An output S2 of the driver assistance system 2 is linked to braking means 5 of the vehicle 1, for example disk brakes.

The driver assistance system 2 comprises the braking module 3 of which an input E3 is linked to the input E2 of the system 2 and an output S3 is connected to the output S2 of the system 2.

The perception means 4 transmit to the module 3 distance and relative speed information between the vehicle 1 and the target 6, for example a car, a pedestrian or a cyclist.

When the braking module 3 perceives a definite risk of collision between the target 6 and the vehicle 1, the module 3 actuates the braking means 5 bringing about an automatic braking of the vehicle 1 so as to prevent the collision between the target 6 and the vehicle 1.

The automatic braking is driven by the module 3 to the maximum of the capabilities of the braking means 5. In other words, the braking is driven in such a way that the stopping distance of the vehicle 1 is the shortest possible. The braking driven in this way is an emergency braking.

In some situations, the braking driven in this way outperforms, that is to say that the maximum braking brings about a stopping of the vehicle 1 at a distance of several meters from the target 6.

The outperforming braking results in the failure of the system 2 to take account of the characteristics of the vehicles, notably of the engine brake and of the weight of the vehicle, and of the environmental conditions in which the vehicle 1 is moving, notably the characteristics of the roadway on which the vehicle 1 is moving, for example the slope of the roadway, and the behavior of the target 6, for example a slight acceleration of the target 6. This effect can be felt by the user of the vehicle as a defect of the driver assistance system 2, and when the vehicle 1 is in front of another vehicle, an emergency braking generates a risk of collision of the two vehicles following one another.

In order to enhance the feeling of the driver of the vehicle and minimize the risks of collision in emergency braking phases, the aim is to drive the braking power of the braking means 5 according to the imminence of the risk of collision and by taking account of the environmental conditions in which the vehicle is moving, that is to say that the aim is to manage the stopping conditions of the vehicle when the braking is sufficiently early and/or effective to avoid the collision between the vehicle and the target according to the characteristics of the roadway on which the vehicle is moving.

In this respect, reference can be made to the document US2016221549 which proposes an electronic control unit which will modulate the braking force of the vehicle as a function of the distance and of the relative speed between the vehicle and a target.

Reference will also be able to be made to the document CN104139781 which presents a method based on the communication of data between two vehicles to regulate the deceleration of the vehicle in an emergency braking situation.

The document US2014156157 describes an AEBS system that allows the driver to override the AEBS system in specific conditions.

The document CA2860892 seeks to enhance the decision-making as to the triggering of the emergency braking by implementing, among other things, motion equations.

In the document DE102011085585, the speed regulation system of the vehicle is directly linked to the brake pedal in order to take account of all the situations brought by the operation of the brake pedal.

Reference will also be able to be made to the document DE102010029223 which illustrates a method in which the relative speed between a followed vehicle and a following vehicle is calculated. The braking is driven by the relative speed.

The methods and devices according to the state of the art set out above are alternative emergency braking methods and devices but do not take account of the characteristics of the vehicles and the environmental conditions in which the vehicle is moving.

The aim of the invention is to overcome these drawbacks.

In light of the above, the invention proposes a method for controlling an emergency braking distance for a motor vehicle comprising a driver assistance system comprising a braking module and a module for controlling emergency braking distance.

According to a feature of the method according to the invention, when the braking module delivers an emergency braking setpoint at the input of said module for controlling distance, said module for controlling distance generates a braking setpoint that is variable according to time and intended for the braking means of said vehicle.

According to another feature, the generation of said braking setpoint uses a one-dimensional dynamic model of said vehicle.

Advantageously, the stopping distance of the vehicle is estimated for a maximum braking setpoint of the braking means and said setpoint is determined.

Preferably, said setpoint is generated in open loop mode.

According to another feature which said setpoint generated in open loop mode is corrected by incorporating correction means forming a closed loop.

Advantageously, an estimation of the acceleration of a target identified by detection means linked to said driver assistance system is determined.

Another subject of the invention is a driver assistance system comprising a braking module and a module for controlling emergency braking distance, the braking module being intended to be linked to braking means.

According to a feature of the system according to the invention, the module for controlling braking distance is linked to an output of the braking module.

Preferably, the system further comprises an embedded processing unit.

Another subject of the invention is a motor vehicle comprising a driver assistance system as defined above.

Other aims, features and advantages of the invention will become apparent on reading the following description, given purely by way of nonlimiting example, and with reference to the attached drawings in which:

FIG. 1, which has already been mentioned, shows the general architecture of an emergency braking device incorporated in a vehicle according to the state of the art;

FIGS. 4 and 5 show examples of braking setpoint on approaching a target generated by the driver assistance device according to the invention.

Figure 2:
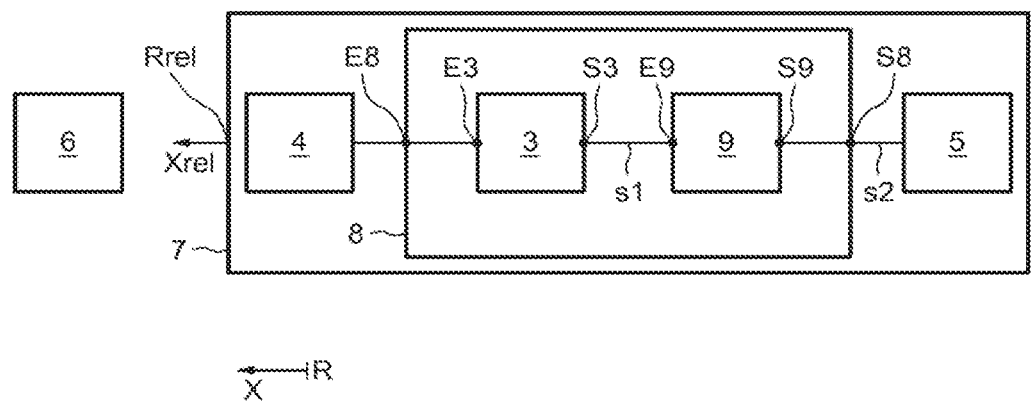
FIG. 2 shows the general architecture of an emergency braking device incorporated in a vehicle according to the invention.

Reference is now made to FIG. 2 which illustrates the architecture of a driver assistance system 8 implementing an emergency braking management method incorporated in a vehicle 7 according to an embodiment of the invention and which interacts with the target 6.

Figure 1:
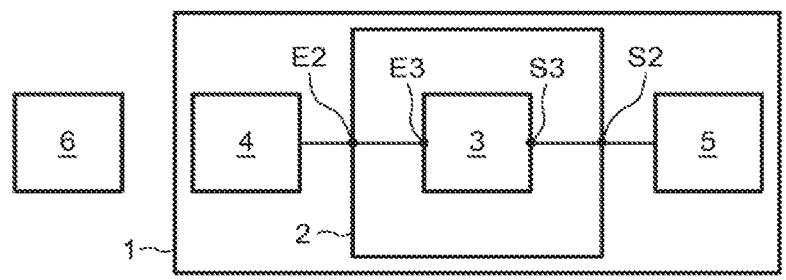

The elements that are identical to those of FIG. 1 are designated by the same numerical references.

The vehicle 7 comprises the perception means 4 and the braking means 5.

The perception means 4 transmit distance and relative speed information between the vehicle 1 and the target 6 to the system 8, and when they are actuated, the braking means 5 brake the vehicle 7.

An input E8 of the driver assistance system 8 is linked to an output of the perception means, and an output S8 of the system 8 is linked to the braking means 5.

The driver assistance system 8 comprises the braking module 3 and a module for controlling emergency braking distance 9.

The input E3 of the braking module 3 is linked to the input E8 and the output S3 of the device 3 is linked to an input E9 of the module for controlling emergency braking distance 9. An output S9 of the module 9 is linked to the output S8.

A signal s1 circulates between the output S3 and the input E9, and a signal s2 circulates between the output S8 and the braking means 5.

The signal s1 comprises the braking setpoint emitted by the module 3 and the signal s2 comprises the braking setpoint $T_{Brk}$ emitted by the module 9.

The determination of the setpoint $T_{Brk}$ will be explained hereinbelow.

The module 9 is situated downstream of the braking module 3 and can be deactivated at any instant. Advantageously, the module 9 has no impact on the tuning of the module 3.

When the module 8 allows only the reduction of speed of the vehicle 7 and not the avoidance of the target 6, the module 9 behaves as a "wire", that is to say that it transmits the signal received at its input E9 to its output S9 without modification, in other words the signals s1 and s2 are identical.

The driver assistance system 8 comprises an embedded processing unit implementing the braking module 3 and the module for controlling emergency braking distance 9.

For example, the processing unit is implemented on the basis of a computer, but it can be any embedded device making it possible to implement the modules 3 and 9.

As will be described in detail hereinbelow, such computation means are for example intended to implement control laws by implementing a dynamic model of the vehicle 7 and of the target 6 incorporated in the module 9 to determine the braking setpoint $T_{Brk}$.

The computation means implement an example of method for controlling a braking distance which is now described.

The method for controlling braking distance comprises a dynamic model that makes it possible to calculate the physical quantities necessary to the execution of the method.

The dynamic model is one-dimensional according to the axis X of an absolute reference frame R linked to the road. The vehicle 7 and the target 6 are assumed rigid without bodywork motion. The different calculations are projected into a relative reference frame linked to the front of the vehicle Rrel.

In the absolute reference frame R, the following notations apply:

$a_{ego}(t)$: the acceleration of the vehicle 7 as a function of time t;

$V_{ego}(t)$: the speed of the vehicle 7 as a function of time t;

$X_{ego}(t)$: the position of the vehicle 7 as a function of time t;

$a_{tgt}(t)$: the acceleration of the target 6 as a function of time t;

$V_{tgt}(t)$: the speed of the target 6 as a function of time t; and $X\_tgt(t)$: the position of the target 6 as a function of time t.

The relative acceleration $a_{rel}(t)$, the relative speed $V_{rel}(t)$ and the relative position $X_{rel}(t)$ between the target 6 and the vehicle 7 are given by the following equations:

$$a_{rel}(t) = a_{tgt}(t) - a_{ego}(t) \qquad \text{(equation 1)}$$

$$V_{rel}(t) = V_{tgt}(t) - V_{ego}(t) \qquad \text{(equation 2)}$$

$$X_{rel}(t) = X_{tgt}(t) - X_{ego}(t) \qquad \text{(equation 3)}$$

By considering the equations of the dynamics, the acceleration $a_{ego}(t)$ of the vehicle 7 is described by the following equation:

$$a_{ego}(t) = -g \cdot \sin \alpha - F_{Pert} - g \cdot \frac{m_0}{m} \cdot [1 - \varepsilon] \cdot \frac{T_{Brk}(t)}{T_{MAX}} \qquad \text{(equation 3)}$$

in which:

g is the acceleration of gravity;

α is the slope of the roadway counted positive in climbing, on which the vehicle 7 is moving;

$F_{Pert}$ is a disruptive braking, for example the engine brake of the vehicle 7;

m is the current weight of the vehicle 7;

$m_0$ is the nominal weight of the vehicle 7 in the tuning of the module 8;

ε is the braking loss factor linked to the road grip of the vehicle 7, for example a is equal to 0.2 on a wet roadway;

$T_{Brk}(t)$ is the variable braking setpoint that is variable according to time t delivered by the module 9; and $T_{MAX}$ is the maximum braking setpoint.

Consequently, the signal s2 is equal to $T_{Brk}$ (t).

The acceleration of the target according to in the absolute reference frame R is given by the following equation:

$$a_{tgt}(t) = A_{tgt} + \Delta a_{tgt}(t) \qquad \text{(equation 4)}$$

in which:

$A_{tgt}$ is the constant acceleration of the target 6 during the emergency braking; and $\Delta a_{tgt}(t)$ is the variable acceleration of the target 6 during the emergency braking as a function of time t.

The relative acceleration $a_{rel}$ in the absolute reference frame R is described by the following equation:

$$a_{rel}(t) = A_{Pert}(t) - K(t) \quad \text{(equation 5)}$$

in which:

$$K(t) = -g \cdot \frac{m_0}{m} \cdot [1 - \varepsilon] \cdot \frac{T_{Brk}(t)}{T_{MAX}}; \text{ and} \quad \text{(equation 6)}$$

$$A_{Pert}(t) = A_{tgt} + \Delta a_{tgt}(t) + g \cdot \sin\alpha + F_{Pert} \quad \text{(equation 7)}$$

The quantities measured by the perception means 4 are denoted as follows:

$V_{rel}^{mes}(t)$ is the relative speed measured at the instant t; and $X_{rel}^{mes}(t)$ is the relative position measured at the instant t.

$V_{ego}^{mes}(t)$ denotes the absolute speed of the vehicle 7 measured at the instant t by measuring means incorporated in the vehicle, notably in the CAN of the vehicle.

The following notations also apply:

$D_{Stop}$ the relative distance between the target 6 and the vehicle 7 for which the relative speed is zero;

$t_{Stop}$ the time at the end of which the relative speed $D_{Stop}$ is canceled out;

$\hat{D}_{T\,max,Vrel=0}$ is an estimation of the stopping distance of the vehicle 7 for the braking setpoint $T_{MAX}$ applied to the braking means 5; and $\hat{A}_{relMAX}$ is an estimation of the relative acceleration $a_{rel}(t)$ for the braking setpoint $T_{MAX}$ applied to the braking means 5.

Figure 3:
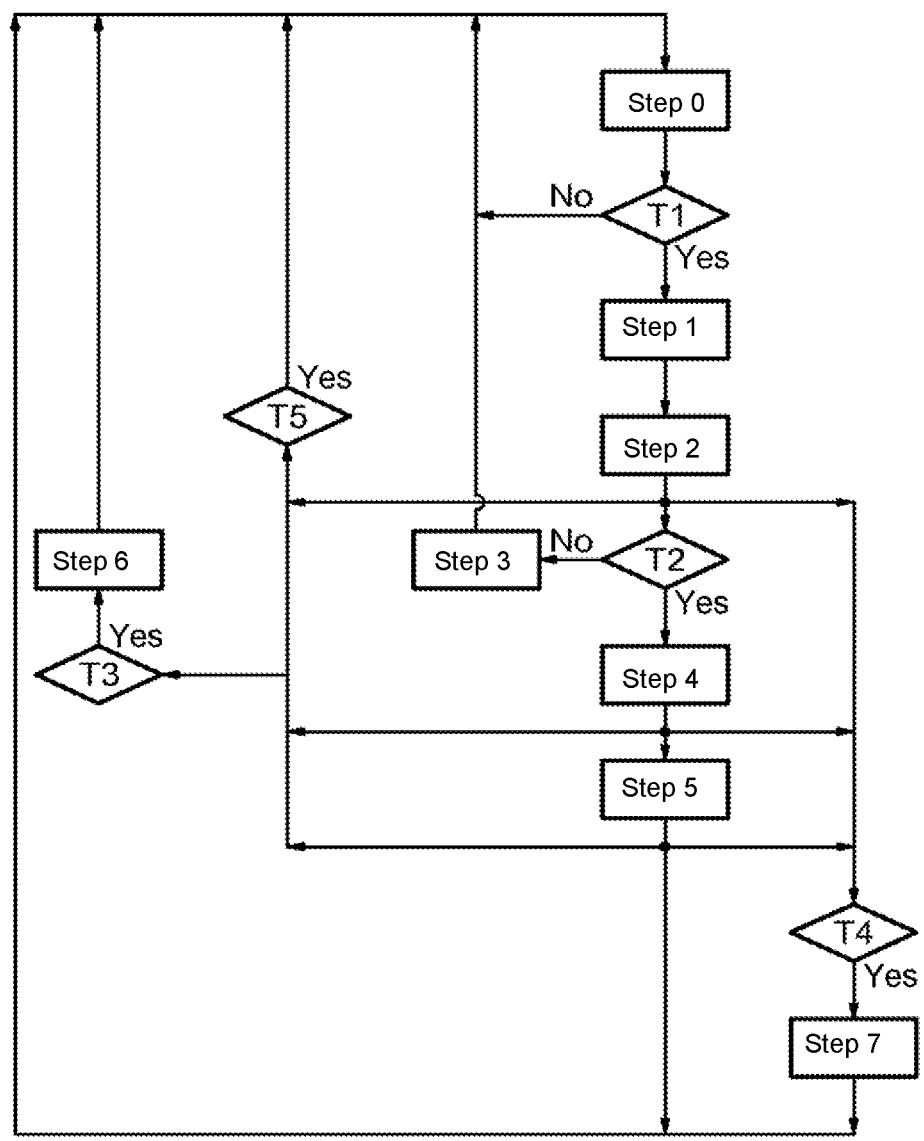
FIG. 3 shows an example of braking setpoint generated by the driver assistance device according to the invention.

FIG. 3 shows the procedure of an example of method for controlling an emergency braking distance implemented in the module 9. The method comprises five logic tests T1, T2, T3, T4 and T5, and eight steps 0, 1, 2, 3, 4, 5, 6 and 7.

A first step 0 is the initial step of the method. In this step, the module 9 behaves as a wire. The signals s1 and s2 are identical. The system 8 behaves like the system 2, as known from the state of the art.

The next step 1 is activated if the set of two conditions is fulfilled, that is to say if the test T1 is validated.

If the test T1 is not validated, the procedure remains at the step 0.

A first condition of the logic test T1 requires the module 3 to generate a signal s1 corresponding to the maximum braking setpoint $T_{MAX}$, the aim of which is a stopping of the vehicle 7.

A second condition requires the method for controlling an emergency braking distance to be authorized for the target 6 detected by the detection means 4. The distance control system is triggered only for targets of chosen type (e.g.: system active for the target vehicles, inactive for pedestrians or cyclists).

In the step 1, the module 9 still behaves as a wire and delivers a signal s2 equal to the signal s1, in other words the braking setpoint s2 is equal to $T_{MAX}$.

This is a waiting step, the duration of which is variable and depends on the state of the braking means 5.

For a maximum braking setpoint $T_{MAX}$, the braking means 5 have a response dynamic range that is variable according to their preceding state. For example, if a moderate braking was ordered previously, the time to reach the maximum braking power corresponding to the setpoint $T_{MAX}$ is reduced by the order of 150 ms.

In the step 2, the stopping distance $\hat{D}_{T\,max,Vrel=0}$ of the vehicle 7 is calculated for the braking setpoint $T_{MAX}$. In this step, the setpoint $T_{Brk}(t)$ delivered to the braking means is equal to $T_{MAX}$.

It is assumed:

that the acceleration of the target 6 is constant:

$$\Delta a_{tgt}(t) = 0 \quad \text{(equation 8)}$$

that the braking setpoint is constant:

$$T_{Brk}(t) = T_{MAX} \quad \text{(equation 9);}$$

and that the relative speed between the target 6 and the vehicle 7 is zero:

$$V_{rel}(t) = 0 \quad \text{(equation 10)}$$

By using the measured values defined previously, the following equations are obtained:

$$\hat{D}_{T\,max,Vrel=0} = -\frac{V_{rel}^{mes}(t)^2}{2\,\hat{A}_{relMAX}} + X_{rel}^{mes}(t) \quad \text{(equation 11)}$$

$$\hat{A}_{relMAX} = \left[\frac{V_{rel}^{mes}(t) - V_{rel}^{mes}(t - \Delta t)}{\Delta t}\right] \quad \text{(equation 12)}$$

The estimation $\hat{D}_{T\,max,Vrel=0}$ of the stopping distance of the vehicle 7 is dependent on the estimation $\hat{A}_{relMAX}$ of the relative acceleration $a_{rel}(t)$ for the setpoint $T_{MAX}$ supplied by the speed measurement over a time interval $\Delta t$. The interval $\Delta t$ depends on the quality of the perception means 4, and the interval is of the order of 100 ms.

The estimation $\hat{D}_{T\,max,Vrel=0}$ is compared to a threshold P in the test T2, P is for example equal to 1 m. The threshold P is the minimum stopping distance of the vehicle 7 before striking the target 6.

If the estimation $D_{T\,max,Vrel=0}$ is above the threshold P, it is considered that the safety conditions are sufficient for a regulation of the braking setpoint. The test T2 is validated and the variable braking setpoint $T_{Brk}(t)$ is authorized, to be determined in the step 4.

If the estimation $\hat{D}_{T\,max,Vrel=0}$ is below the threshold P, the test T2 is not validated and the procedure goes to the step 3.

In the step 3, the braking setpoint s2 equal to the maximum braking set point $T_{MAX}$ is maintained. The setpoint $T_{Brk}(t)$ is equal to $T_{MAX}$ for a predetermined time $T_{out}$ then, at the end of this time, the procedure reverts to the initial step 0.

In the step 4, the estimation $\hat{D}_{T\,max,Vrel=0}$ is recalculated as a function of the relative positions and speeds $X_{rel}^{mes}(t)$ and $V_{rel}^{mes}(t)$.

The braking setpoint $T_{Brk}(t)$ that makes it possible to cancel the relative speed $V_{rel}$ at a distance $D_{Stop}$ from the target 6, for example $D_{Stop}$ is equal to 0.5 m, is calculated in open loop mode on each calculation step.

It is assumed that the engine brake, the slope and the behavior of the target 6 remain similar to those of the preceding states.

The precise data on weight m and state of the road s not being available, conditions giving the maximum braking setpoint $T_{Brk}(t)$ are considered, i.e.:

$$m = m_0; \text{ and} \quad \text{(equation 13)}$$

$$\varepsilon = 0 \quad \text{(equation 14)}$$

Under these assumptions, the expression of the braking setpoint $T_{Brk}(t)$ in open loop mode is described by the following equations:

$$T_{Brk}(t) = T_{MAX} - \frac{T_{MAX}}{g} \cdot \left(\hat{A}_{relMAX} - \hat{A}_{rel}^{cmd}(t)\right) \quad \text{(equation 15)}$$

in which $$\hat{A}_{rel}^{cmd}(t) = \frac{V_{rel}^{mes}(t)^2}{2 \cdot (X_{rel}^{mes}(t)) - D_{Stop})} \quad \text{(equation 16)}$$

and $\hat{A}_{relMAX}$ is calculated as described previously in the step 2.

The use of the setpoint $T_{Brk}(t)$ in open loop mode comprising the estimation $\hat{A}_{relMAX}$ of the relative acceleration $a_{rel}(t)$ for the braking setpoint $T_{MAX}$ makes it possible to take account of the environmental conditions. Indeed, the estimation $\hat{A}_{relMAX}$ is determined according to the measured relative speed $V_{rel}^{mes}(t)$.

Then, in the step 5, the setpoint $T_{Brk}(t)$ is corrected so as to take account of the disturbances caused notably by the engine brake of the vehicle 7.

After a predefined time, for example 100 ms, the setpoint $T_{Brk}(t)$ calculated in the preceding step by using an estimation of the acceleration $\hat{A}_{rel}^{cmd}(t)$ is recalculated by using a closed loop regulation based on the error of relative acceleration $E_{Acmd}(t)$ by incorporating correction means. The correction means comprise a regulator of PI (proportional integral) type for proportional gain $k_p$ and integral gain $k_i$ coefficients in the regulation loop. The gain coefficients $k_p$ and $k_i$ are determined by the usual methods known to the person skilled in the art.

In fact, the desired braking setpoint $T_{Brk}(t)$ is different from the corresponding braking power developed by the braking means 5 by virtue of disturbances, notably caused by the engine brake of the vehicle 7, the dynamics of the braking means 5. It is necessary to take account of this deviation to correct the setpoint value $T_{Brk}(t)$.

The following equation gives the error $E_{Acmd}(t)$ of relative acceleration:

$$E_{Acmd}(t) = \frac{V_{rel}^{mes}(t)^2}{2 \cdot (X_{rel}^{mes}(t) - D_{Stop})} - \left[\frac{V_{rel}^{mes}(t - \Delta t) - V_{rel}^{mes}(t)}{\Delta t}\right] \quad \text{(equation 17)}$$

in which $\Delta t$ is a time interval necessary to perform an estimation of the real acceleration, for example $\Delta t$ is equal to 100 ms.

By using the relative acceleration error formula $E_{Acmd}(t)$ defined in the equation 17, the closed loop control becomes:

$$T_{Brk}(t) = T_{MAX} - \frac{T_{MAX}}{g} \cdot$$
$$\left(\hat{A}_{relMAX} - \left[\hat{A}_{rel}^{cmd}(t) + k_p \cdot E_{Acmd}(t) + k_i \cdot \Sigma E_{Acmd}(t)\right]\right) \quad \text{(equation 18)}$$

The summer $\Sigma E_{Acmd}(t)$ is reset to zero as soon as the procedure is at the step 5. Moreover, the state of the summer $\Sigma E_{Acmd}(t)$ is maintained if the setpoint $T_{Brk}(t)$ is saturated, that is to say if $T_{Brk}(t)$ is equal to $T_{MAX}$ or if $T_{Brk}(t)$ is equal to the minimum braking value $T_{MIN}$ determined according to the characteristics of the braking means 5.

According to the equation 16, the relative acceleration $\hat{A}_{rel}^{cmd}(t)$ allowing the vehicle 7 to stop at the desired distance depends on the position measurement $X_{rel}^{mes}(t)$.

On approaching the target 6, the position measurement errors of the detection means 4 are significant and the estimation of the relative speed $X_{rel}^{mes}(t)$ is difficult.

When the method is at the step 4 or 5 and the target 6 is at a distance less than a threshold H, for example 0.4 m, the test T3 is validated and the procedure goes to the step 6.

In this step, the braking setpoint $T_{Brk}(t)$ in the preceding step, that is to say in the step 4 or 5, is maintained until the end of the braking. The braking setpoint is constant and unregulated. At the end of the braking, the procedure returns to the step 0.

In all the preceding steps, the braking setpoint $T_{Brk}(t)$ was determined by assuming that the acceleration $a_{tgt}(t)$ of the target 6 is constant, that is to say that $\Delta a_{tgt}(t)$ is zero.

To some extent, the module 9 is capable of making up absolute acceleration variations $\Delta a_{tgt}(t)$ of the target 6. Nevertheless, if the target 6 brakes suddenly while the module 9 is in a step other than the steps 0 and 1 the time necessary for the braking setpoint $T_{Brk}(t)$ to be saturated, that is to say in this case equal to $T_{MAX}$, is too long.

The estimation $\hat{D}_{T max, Vref=0}$ comprising the calculation of the estimation $\hat{A}_{relMAX}$ of the relative acceleration $a_{rel}(t)$ for the braking setpoint $T_{MAX}$ is no longer valid. Indeed, the calculation of the estimation $\hat{A}_{relMAX}$ takes as assumption a movement of the target 6 according to a constant acceleration, that is to say that $\Delta a_{tgt}(t)$ is zero. This assumption is no longer borne out in the event of sudden braking.

When a sudden braking of the target 6 is detected in one of the steps 2, 4 or 5, that is to say when the test T4 is validated, the procedure goes to the step 7. The determination of a sudden braking of the target 6 will be explained hereinbelow.

In the step 7, the braking setpoint $T_{Brk}(t)$ is equal to $T_{MAX}$ for the duration of the braking then the procedure goes to the step 0. The module 9 behaves as a wire.

To detect a sudden braking of the target 6, an estimator $\hat{A}_{tgt}(t)$ of the acceleration $a_{tgt}(t)$ of the target 6 is determined.

The estimator $\hat{A}_{tgt}(t)$ is described by the following equation:

$$\hat{A}_{tgt}(t) = \frac{V_{rel}^{mes}(t) + V_{ego}^{mes}(t) - V_{rel}^{mes}(t - \Delta t) - V_{ego}^{mes}(t - \Delta t)}{\Delta t} \quad \text{(equation 19)}$$

To estimate the acceleration of the target 6 at the instant t, the relative speed $V_{rel}^{mes}$ and the absolute speed $V_{ego}^{mes}$ of the vehicle 7 are measured at the instant $t - \Delta t$ and at the instant t, $\Delta t$ being a fixed time equal for example to 100 ms.

If the estimator $\hat{A}_{tgt}(t)$ gives a value at the instant t below a threshold T, for example $-2.5$ m/s$^2$, it is deduced therefrom that the target 6 is braking suddenly.

In the steps 2, 4 and 5, the relative acceleration $a_{rel}(t)$ is determined according to the trend of the relative speed $V_{rel}^{mes}$.

Upon a change of target, there can be an abrupt jump in the relative speed that can disrupt the regulation loops. To avoid this phenomenon, a change of target generates a return to the initial state that is to say to the step 0.

The braking module 3 operates with a waiting time, or "timeout". When the braking is triggered, the braking will be stopped after a determined time, for example 2 seconds.

When the braking setpoint is maximal, that is to say $T_{Brk}(t)$ is equal to $T_{MAX}$, that does not present any problem.

However, since the module 9 varies the value of the braking setpoint $T_{Brk}(t)$, notably by reducing the value of the braking power demanded s1 from the module 3, it is probable that the module 3 will stop supplying a braking setpoint before the relative speed $V_{rel}^{mes}(t)$ is zero.

To eliminate this risk, the module 9 adjusts the minimum braking setpoint $T_{MIN}$ for the relative speed $V_{rel}^{mes}(t)$ to be zero at the end of a predetermined time counted from the triggering of the braking. This time is for example equal to 5 seconds. In this case, the final distance constraint is then considered secondary and will no longer be observed.

In order to secure the module 9, at each calculation step in the different steps of the method described previously, the estimation $\hat{D}_{T\ max,Vrel=0}$ of the stopping distance of the vehicle 7 for the braking setpoint $T_{MAX}$ is recalculated. If this distance becomes less than a threshold R, for example the value of R is equal to 0.4 m, the setpoint $T_{Brk}(t)$ is equal to $T_{MAX}$ for the duration of braking, then the procedure goes to the initial step 0.

Figure 4:
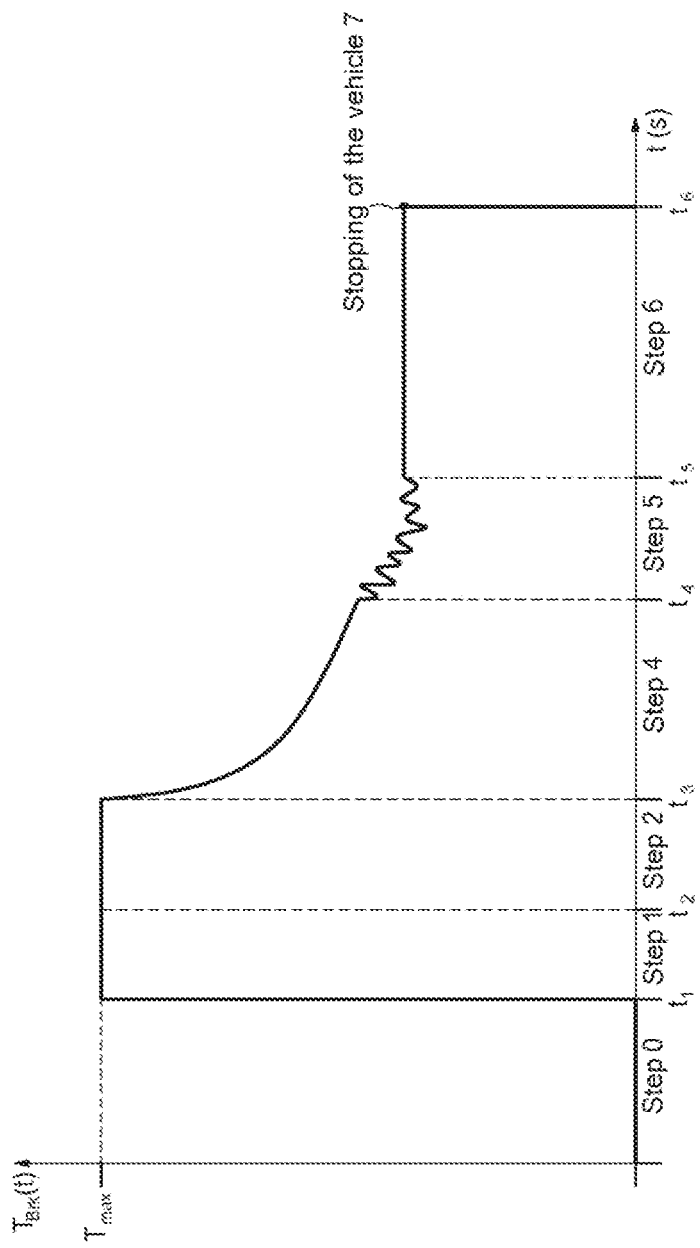

FIG. 4 illustrates a braking phase according to the procedure described previously in the case where the value of the estimation $\hat{D}_{T\ max,Vrel=0}$ is above the threshold value R for all the calculation steps and the value of the estimator $\hat{A}_{tgt}(t)$ of the acceleration $a_{tgt}(t)$ of the target 6 is above the threshold T, that is to say that the target 6 is not braking suddenly.

It represents the braking setpoint $T_{Brk}(t)$ that is variable according to time t delivered by the module 9 to the braking means 5.

In the step 0 of the method, the module 9 behaves as a wire.

At the instant t1, the braking module 3 delivers a signal s1 equal to $T_{MAX}$ following the detection of a risk of collision with the target 6 by the driver assistance system 8.

The target 6 is authorized, the test 1 is validated. The method goes to the step 1. The module 9 still behaves as a wire, $T_{Brk}(t)$ is equal to s1, that is to say that $T_{Brk}(t)$ is equal to $T_{MAX}$.

Then, the method goes to the step 2 at the instant t2. The setpoint $T_{Brk}(t)$ is equal to $T_{MAX}$ and the value of the estimation $\hat{D}_{T\ max,Vrel=0}$ is estimated. The estimated value is above the threshold P, the test T2 is validated.

The method goes to the step 4 at the instant t3. The braking setpoint $T_{Brk}(t)$ is recalculated in open loop mode so as to take account of the conditions of the roadway.

Then, at the instant t4, the braking setpoint $T_{Brk}(t)$ is recalculated in the step 5 in closed loop mode so as to correct the setpoint determined in open loop mode by taking account of the disturbances linked to the vehicle 7, notably the disturbances caused by the engine brake of the vehicle 7.

Then, at the instant t5, the vehicle 7 is close to the target 6, that is to say at a distance below the threshold H. The test T4 is validated and the method goes to the step 6.

In this step, the braking setpoint $T_{Brk}(t)$ in the preceding step, that is to say in the step 5, is maintained until the end of the braking. The vehicle 7 stops at the instant t6.

FIG. 5 illustrates a braking phase according to the procedure described previously in the case where the value of the estimation $\hat{D}_{T\ max,Vrel=0}$ is below the threshold value R for a calculation step at the end of the step 3 at the instant t7.

The steps 0, 1, 2 and 3 of FIG. 4 apply once again and proceed as described previously.

At the instant t7, the setpoint $T_{Brk}(t)$ is equal to $T_{MAX}$ for the duration of braking, then the procedure goes to the initial step 0.

Advantageously, in the event of an emergency braking, the method for controlling an emergency braking distance generates a control law for the braking means of the vehicle 7 that takes account of the characteristics of the vehicle and the environmental conditions in which the vehicle is moving so as to optimize the braking stopping distance of the vehicle, while guaranteeing at each instant of the emergency braking phase procedure, that a risk of collision between the vehicle 7 and the detected target 6 is eliminated.

The invention claimed is:

1. A method for controlling an emergency braking distance for a motor vehicle comprising a driver assistance system comprising a braking module and a control module configured to control an emergency braking distance, the braking module and the control module being implemented by circuitry, the method comprising:
   generating, by the circuitry, when the braking module delivers an emergency braking setpoint at an input of the control module, a braking setpoint, the braking setpoint being variable according to time and configured for a braking device of the vehicle, the generating generates the braking setpoint using a one-dimensional dynamic model of the vehicle, the one-dimensional dynamic model including an acceleration of the vehicle as a function of time, which is determined based on an engine brake of the vehicle; and
   correcting, by the circuitry, the braking setpoint that has been generated based on the engine brake of the vehicle.

2. The method as claimed in claim 1, further comprising estimating a stopping distance of the vehicle for a maximum braking setpoint of the braking device and determining the braking setpoint.

3. The method as claimed in claim 1, wherein the braking setpoint is generated in open loop mode.

4. The method as claimed in claim 3, wherein the braking setpoint generated in open loop mode is corrected by incorporating a correction device forming a closed loop.

5. The method as claimed in claim 1, wherein an estimation of an acceleration of a target identified by a detector linked to the driver assistance system is determined.

6. The method as claimed in claim 1, wherein
   the one-dimensional dynamic model used to generate the braking setpoint includes the acceleration of the vehicle as a function of time, a speed of the vehicle as a function of time, a position of the vehicle as a function of time, an acceleration of a target as a function of time, a speed of the target as a function of time, and a position of the target as a function of time.

7. The method as claimed in claim 1, wherein
   the acceleration of the vehicle as a function of time is determined based on the engine brake of the vehicle as well as a weight of the vehicle.

8. A driver assistance system, comprising:
   a braking module implemented by circuitry; and
   a control module implemented by the circuitry and configured to control an emergency braking distance, wherein
   the braking module is configured to be linked to a braking device of a vehicle,
   the control module is linked to an output of the braking module, and
   the control module is further configured to
      generate, when the braking module delivers an emergency braking setpoint at an input of the control module, a braking setpoint, the braking setpoint being variable according to time and configured for a braking device of the vehicle, the control module generates the braking setpoint using a one-dimensional dynamic model of the vehicle, the one-dimensional dynamic model including an acceleration of the vehicle as a function of time, which is determined based on an engine brake of the vehicle, and correct the braking setpoint that has been generated based on the engine brake of the vehicle.

9. A motor vehicle comprising:

the driver assistance system as claimed in claim 8.

10. The driver assistance system claimed in claim 8, wherein the one-dimensional dynamic model used to generate the braking setpoint includes the acceleration of the vehicle as a function of time, a speed of the vehicle as a function of time, a position of the vehicle as a function of time, an acceleration of a target as a function of time, a speed of the target as a function of time, and a position of the target as a function of time.

* * * * *